US005172988A

United States Patent [19]

Ledley et al.

[11] Patent Number: 5,172,988

[45] Date of Patent: Dec. 22, 1992

[54] FORM PRINTER WITH INTERACTIVE CAMERA AND COMPUTER CONTROL

[76] Inventors: Robert S. Ledley, 1002 LaGrande Rd., Silver Spring, Md. 20903; Thomas J. Golab, 13000 Greenmount Ave., Beltsville, Md. 20705

[21] Appl. No.: 665,395

[22] Filed: Mar. 6, 1991

[51] Int. Cl.[5] .......................... B41J 3/46; B41J 21/16; G06K 9/20

[52] U.S. Cl. ...................................... 400/83; 400/279; 400/320; 358/483; 382/58; 382/61; 395/106

[58] Field of Search ..................... 400/83, 73, 76, 320, 400/120, 279; 358/483, 903, 448, 452, 453; 382/58, 59, 61, 62; 395/106; 364/406

[56] References Cited

U.S. PATENT DOCUMENTS

| | | | |
|---|---|---|---|
| 3,803,350 | 4/1974 | Lemelson | 358/903 |
| 3,846,022 | 11/1974 | Kurhi | 355/53 |
| 4,196,450 | 4/1980 | Miller et al. | 358/903 |
| 4,487,515 | 12/1984 | Harris | 400/121 |
| 4,513,390 | 4/1985 | Walter et al. | 358/483 |
| 4,742,485 | 5/1988 | Carlson et al. | 400/83 |
| 4,901,364 | 2/1990 | Faulkerson et al. | 358/903 |
| 4,939,578 | 7/1990 | Kano | 358/483 |
| 4,962,430 | 10/1990 | Hiroki et al. | 358/483 |

FOREIGN PATENT DOCUMENTS

| | | | |
|---|---|---|---|
| 0048118 | 3/1982 | European Pat. Off. | 358/483 |
| 0062479 | 10/1982 | European Pat. Off. | 358/483 |
| 0274266 | 7/1988 | European Pat. Off. | 400/120 HE |
| 3215225 | 11/1983 | Fed. Rep. of Germany | 400/320 |
| 3400097 | 7/1985 | Fed. Rep. of Germany | 400/73 |
| 0201462 | 11/1983 | Japan | 358/483 |

OTHER PUBLICATIONS

"Scanning Typewriter" IBM Tech. Discl. Bulletin, vol. 20, No. 4, Sep. 1977, p. 1299.

"Video Mixer" IBM Technical Disclosure Bulletin, vol. 15, No. 11, Apr. 73 p. 3558.

"The Application of CCD's to Document Scanning" Microelectronics, vol. 7, No. 2, pp. 60–63 Dec. 1975.

*Primary Examiner*—Eugene H. Eickholt
*Attorney, Agent, or Firm*—Joseph G. Seeber

[57] ABSTRACT

The invention provides the user with the capability of viewing a form positioned in a printer associated with a computer, a keyboard and a monitor. The printer has a camera and a lens positioned thereon, the camera including an image sensing array for providing video signals corresponding to images sensed on the form. The computer processes the video signals to display images sensed on various portions of the form. The user responds by entering via a keyboard data corresponding to the various portions of the form displayed. During the first use of a form, the computer memorizes the portions of the form for which data are entered and on which data are to be printed. For subsequent uses of the form the corresponding data are entered via the keyboard, and the printer automatically fills in the form.

9 Claims, 5 Drawing Sheets

FORM PRINTER WITH INTERACTIVE CAMERA AND COMPUTER CONTROL

TECHNICAL FIELD

The present invention relates to a form printer, and more particularly to a computer-driven printer specially designed to enable the user to fill in business forms or other forms.

BACKGROUND ART

Technology has advanced to the point where businesses and offices are purchasing distributed computer systems so that substantially every employee has a computer at his or her desk, and the various computers in the business or office are interconnected to form a distributed computer network. The ultimate goal of such innovation is to arrive eventually at the point where the business or office will be "paperless". In such an environment, as the term "paperless" suggests, paper communication between the various employees will be completely or virtually eliminated, and will be replaced by data communication from one employee's computer to another employee's computer via the distributed computer network.

However, as advantageous as such a distributed computer network is, there is a problem. Specifically, since such a distributed computer network calls for the replacement of each employee's typewriter by a computer with keyboard, printer and monitor, certain employees are at a loss when it comes to filling out forms which they customarily utilize in their work. One solution, but not at all a desirable solution, is for such an employee to retain a typewriter at his or her working position. This is expensive, and also tends to clutter up the employee's working position, especially since a substantial amount of space must be allocated for the computer, keyboard, printer and monitor.

Accordingly, it is considered desirable to provide such an employee with the ability to fill out forms easily using the computer, keyboard, monitor and printer alone, thus eliminating the necessity to maintain a typewriter as well.

The following two patents are considered to be of general background interest relative to the present invention: U.S. Pat. No. 3,846,022 —Kurhi and U.S. Pat. No. 4,487,515—Harris.

DISCLOSURE OF INVENTION

The present invention relates to a form printer, and more particularly to a modified computer-driven printer and associated computer, keyboard and monitor for enabling a user to fill in a business form or other forms through user interaction with the keyboard and monitor.

In accordance with the invention, the user is able to employ the computer, keyboard, printer and monitor alone to fill in the form in a manner analogous to the manner in which a typewriter would have been utilized previously to fill in the form. In accordance with a further feature of the invention, as a form of a particular kind is filled in for the first time, the computer "learns" and "remembers" where the various blanks or boxes are actually located on the form, and future forms of that kind can be filled in automatically. That is to say, for each form after the first form, only the data items themselves need be provided to the computer, and the computer automatically positions the printhead correctly with respect to the blanks or boxes on the form, the computer directing the printer to print the data items entered in the proper places on the form.

In general, the invention calls for the attachment of a bracket to the printhead of the printer, that bracket serving as a mounting piece for a lens and a charged-coupled device (CCD) camera chip. The latter arrangement serves as a viewing arrangement, viewing an area on the form positioned in the printer, and the viewed area is seen by the user on the computer monitor or display unit. This unique feature of the present invention permits the user to employ the computer, keyboard and printer to fill in a form the first time by looking at the viewing area of the form as it appears on the computer monitor and adjusting the printhead of the printer properly for each datum to be entered. In this manner, data items are entered on the initial form at the precise locations required. At any later time, when completing the same kind of form, the user need only type on the keyboard the data items themselves in proper sequence, the computer automatically provides the data in proper sequence to the printer, and the printer automatically inserts the data at the appropriate locations on the form.

As indicated above, the primary advantage of this invention is that it eliminates the need for retaining a typewriter on the user's desk. That is to say, in accordance with the present invention, the user employs the keyboard and computer while looking at the viewing area of a form in the printer on the monitor so as to control the printer to perform any and all printing procedures required, including filling in forms. A further advantage of the invention resides in the fact that, once a certain kind of form is completed, the computer "remembers" the positions on the form where the data are to be inserted, and data entry and printing of the form become an automatic process.

Therefore, it is a primary object of the present invention to provide a computer-driven printer for filling in business forms or other forms.

It is an additional object of the present invention to provide a computer-driven printer which, as a result of user interaction using a computer, a keyboard and a computer monitor, can be "taught" to fill in a business form or other forms.

It is an additional object of the present invention to provide a computer-driven printer which, after being "taught" by the user to fill in a given type of business form or other form, automatically fills in subsequent business or other forms of the same type.

It is an additional object of the present invention to provide a computer-driven printer having a miniature camera or camera/lens combination mounted thereon and connected via a computer to a monitor, so as to provide the user with the capability of viewing a form positioned in the printer.

The above and other objects, and the nature of the invention, will be more clearly understood by reference to the following detailed description, the accompanying drawings, and the appended claims.

BEST MODE FOR CARRYING OUT THE INVENTION

The invention will now be described in more detail with reference to the accompanying drawings.

Figure 1:
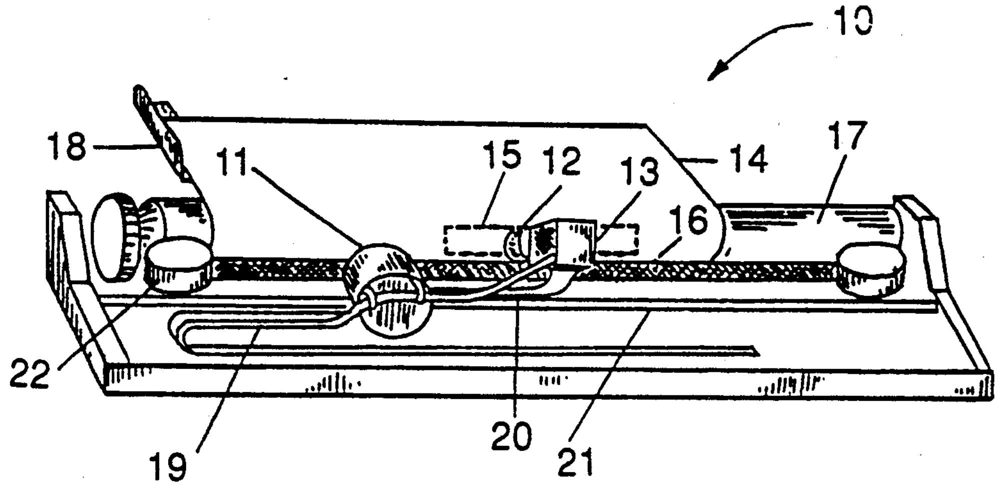
FIG. 1 is a perspective view of the computer-driven printer of the present invention.

FIG. 1 is a perspective view of the computer-driven printer of the present invention.

As seen therein, the printer 10 comprises a printhead 11, a lens 12, a miniature television camera 13, a form 14 positioned in the printer 10 and having an area of view 15 in front of lens 12 and camera 13, a ribbon 16, a platen 17, a paper guide 18, a cable 19 for conveying video signals from the camera 13, a bracket 20 holding the lens 12 and camera 13, a printhead moving mechanism 21 connected to a motor (not shown), and a ribbon spool 22.

In accordance with the present invention, the bracket 20 is attached to the printhead 11, and the bracket 20 holds lens 12 and miniature camera 13, the camera 13 comprising a CCD camera chip. When lens 12 and camera 13 are positioned in front of an area of view 15 on form 14, the area of view 15 having dimensions (for example, of 2.5"×1"), the area 15 can be seen on any monitor connected to camera 13 via cable 19 and an appropriate interface (as will be explained below). The purpose of lens 12 is to provide an enlarged view of area 15 on the monitor for easy viewing. It should be noted that camera 13 can contain only a CCD television chip on bracket 20 behind lens 12, with the remainder of the television circuitry located at the other end of cable 19 (for example, in the base of printer 10); alternatively, a few components of the television circuitry can be located on bracket 20, and the remaining components located at the other end of cable 19. A further variation of the present invention involves the positioning of a fiber optic pickup at the printhead 11. This permits flexibility in location of the camera 13. In this variation, there would still have to be a lens 12.

It should also be noted that the lens 12 and miniature camera 13 are mounted via bracket 20 on the printhead 11 so that those elements move with the printhead 11 when the printer 10 is operational.

Printer 10 can be any standard printer modified in accordance with the specifications set forth herein, or can be a printer specially made in accordance with the specifications contained herein. In that regard, printer 10 must be capable of physically accommodating bracket 20 with lens 12 and camera 13 mounted thereon relative to printhead 11. Printer 10 must also have the capability of rolling paper form 14 both forward (upward) or in reverse (downward) in order to have the capability of relocating printhead 11 over each area 15 scanned by camera 13.

Figure 2:
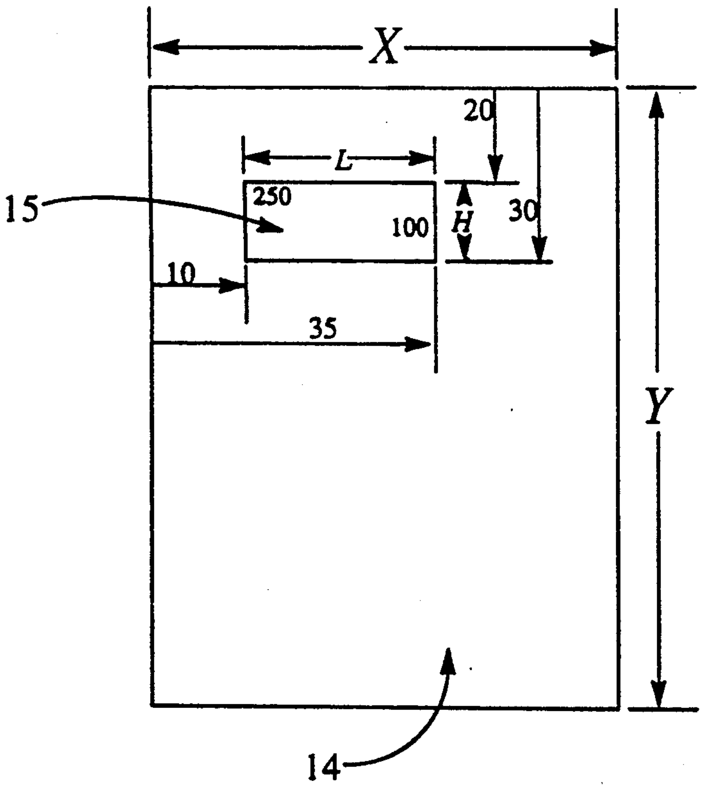
FIG. 2 is an illustration of a form which can be inserted into the printer of the present invention.

FIG. 2 is an illustration of the form 14 positioned in the printer 10, including an area of view 15 previously discussed. For the purposes of the present invention, the area 15 is considered to be an area 250 units wide by 100 units high. Thus, for a viewing area 15 having dimensions 2.5"×1" as previously discussed, each unit equals 0.01". Moreover, the unit of measurement mentioned here is selected so that a small square measuring one unit on a side constitutes a pixel or picture element for the purpose of scanning of form 14 by camera 13 (FIG. 1). This is discussed further below.

Figure 3:
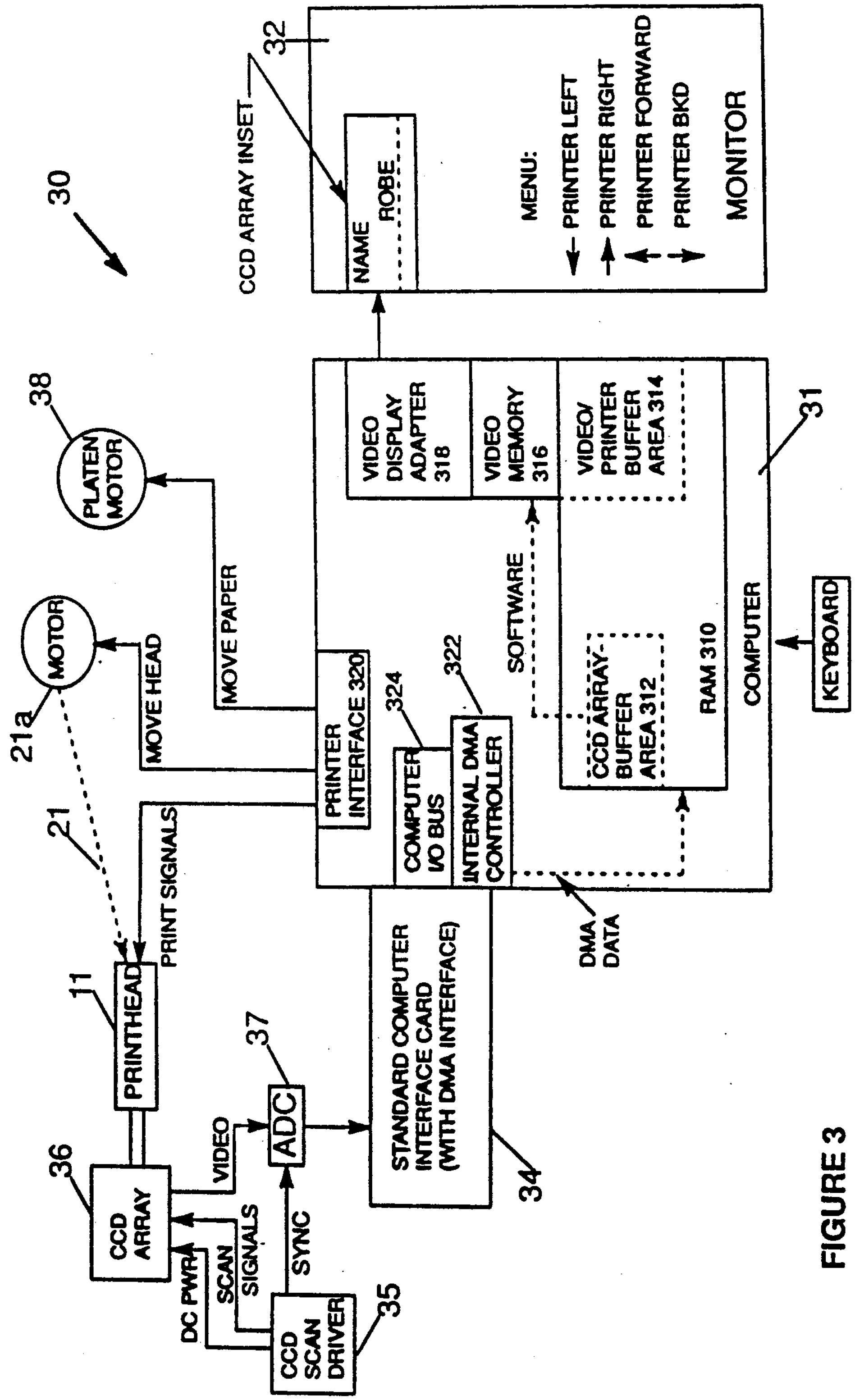
FIG. 3 is a block diagram of the computer system employed with the printer of the present invention.

FIG. 3 is a block diagram of the computer system 30 with which the printer 10 of FIG. 1 is operational. As seen in FIG. 3, computer system 30 comprises computer 31, monitor 32, keyboard 33, computer interface card 34 (with direct memory access or DMA interface), CCD scan driver 35, CCD array 36, and analog-to-digital converter (ADC) 37. Also shown in FIG. 3 are printhead 11 and motor 21*a* (interconnected by printhead moving mechanism 21), as well as platen motor 38 associated with printer 10 of FIG. 1 (but not shown in FIG. 1).

Computer 31, monitor 32 and keyboard 33 are, preferably, standard office or home computer equipment to which the printer 10 (FIG. 1) is attached. For example, an IBM personal computer or compatible can be employed, especially in view of the fact that it has an internal DMA controller. This renders interface with the printer 10 quite simple. Computers not compatible with the IBM personal computer may also be employed but with a different computer interface and modified software, as will be obvious to those of skill in the art after reading the specifications contained herein.

CCD scan driver 35 is a conventional device. For example, a CCD3000 manufactured by Fairchild-Weston may be employed. As will be discussed below, CCD scan driver 35 is responsible for providing direct current power to CCD array 36, for generating scan signals so that registers in CCD array 36 are loaded as data are read point by point and line by line, and for generating synchronization signals for synchronizing the operation of ADC 37.

CCD array 36 is a conventional CCD image sensing array located in camera 13 (FIG. 1). For example, CCD array 36 can be an RA0256B manufactured by EG & G Reticon or can be a CCD222 manufactured by Fairchild-Weston. The provision of lens 12 (FIG. 1) located in front of CCD array 36 (that is, between it and the form 14) results in focusing on an area of the size previously mentioned, that is, 2.5"×1". Preferably, CCD array 36 is capable of storing the 25,000 picture elements contained in viewing area 15 (FIG. 2).

ADC 37 is a conventional device for converting analog video signals from CCD array 36 to digital form. If only a "black vs. white" distinction is desired, ADC 37 can simply be provided with a one-bit output. However, if the capability of distinguishing between black, white and various shades of grey is desired, ADC 37 can be provided with a multi-bit output.

Under the control of synchronization signals from CCD scan driver 35, ADC 37 can sample and digitize the analog video output signals of CCD array 36 in various ways. One such way would be to take 250 samples across each array line and sample only 100 array lines, resulting in 25,000 samples as indicated by the dimensions of viewing area 15 (FIG. 2).

Thus, operation of ADC 37 is synchronized by CCD scan driver 35, which generates synchronization signals resulting in the loading of the registers in CCD array 36 with image data and reading out of that data point by point and line by line. In this regard, the pixel scan rate could be nominally 500 kHz., which would scan out a 250×100 array in 0.05 seconds. In order to initialize the scanning operation, the computer 31 will supply a start scanning pulse to the scan driver 35 via interface card 34. Of course, alternatively, a reverse communication procedure from driver 35 to computer 31 via interface 34 can be employed.

Further referring to FIG. 3, computer 31 comprises a conventional random access memory (RAM) 310, which in turn includes a storage area serving as a CCD array buffer area 312 for storing data received from CCD array 36 via ADC 37 and interface card 34, and a video/printer buffer area 314. Computer 31 also includes the following conventional elements: video memory 316, video display adapter 318, printer interface 320, internal DMA controller 322 and computer I/O bus 324.

A standard printer interface card can be employed as printer interface 320, and is used to move printhead 11 back and forth (left and right), while causing printhead 11 to print as appropriate. The movement function is carried out by transmission of MOVE HEAD signals from printer interface 320 to motor 21 (operationally connected to printhead 11), while the printing function is carried out by transmission of PRINT signals from printer interface 320 to printhead 11. For optimum performance, printer interface 320 and printer 10 should be selected or designed to move the platen 17 (FIG. 1) forward and backward. Otherwise, if the platen 17 can only be moved forward, the system will have to be set to print one complete line out of the video/printer buffer area 314 before advancement of the platen 17. Whereas such a mode of operation is satisfactory, the ideal mode of operation is one in which it is not necessary to print one complete line out of buffer area 314 before advancement of platen 17. In any event, movement of the form 14 by moving the platen 17 is carried out by transmission of a MOVE PAPER signal by printer interface 320 to platen motor 38 (FIG. 3) contained in printer 10 (FIG. 1).

Computer interface card 34 is a conventional I/0 interface design for reading or writing timing signals from a computer to external electronics. Some minimal circuitry can be added to this external card, and such circuitry will function in conjunction with the internal DMA controller 322 of computer 31 to allow data from ADC 37 to be transferred to a predetermined area of RAM 310 without program control for each transfer. Interface 34 should have at least one input/output write address to allow the computer 31 to start the scanning and direct memory access on interface card 34. However, this is not necessary because the TC signal can be used to stop the direct memory access signals.

The designation "TC" stands for "terminal count". For example, the TC signal is on pin B27 of the I/O connecter on an IBM PC (or compatible). It goes high when the word count register counts the number of bytes to be transferred in that DMA cycle. This number is put into the word count register by the program when the DMA sequence is initialized. In the example disclosed herein, the number would be 25,000. The program also specifies the starting address of the CCD array buffer area 312 in the RAM 310 in the arrangement disclosed herein.

A first-in-first-out (FIFO) buffer in interface 34 can be employed to allow a 500 kHz. throughput so that the scan rate of CCD array 36 can be the 500 kHz. rate mentioned earlier. If no FIFO buffer is employed, the scan rate would be slower (for example, 100 kHz.).

Figure 4A:
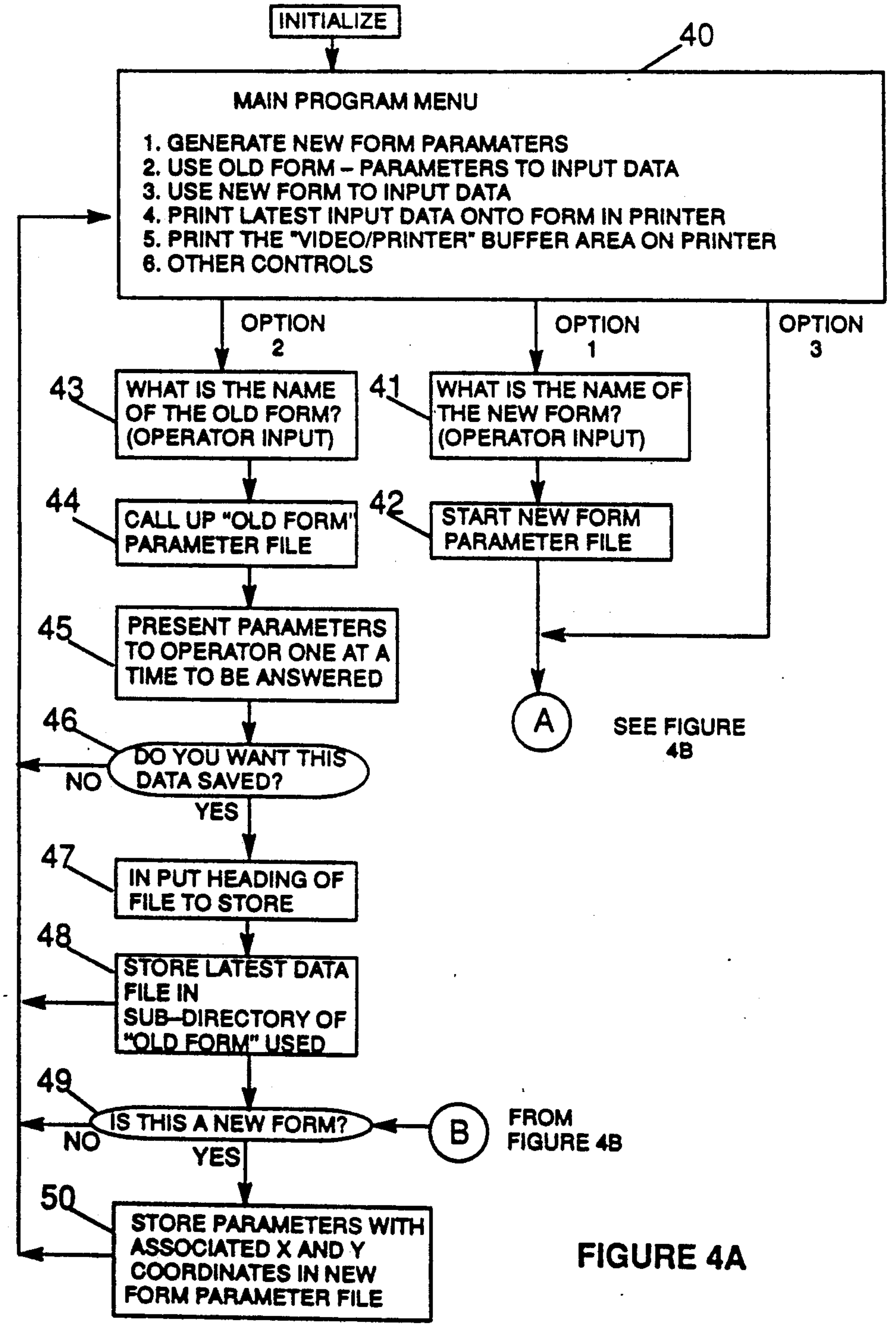
FIGS. 4A and 4B are flowcharts of the operations performed by the processor or computer of FIG. 3.
Figure 4B:
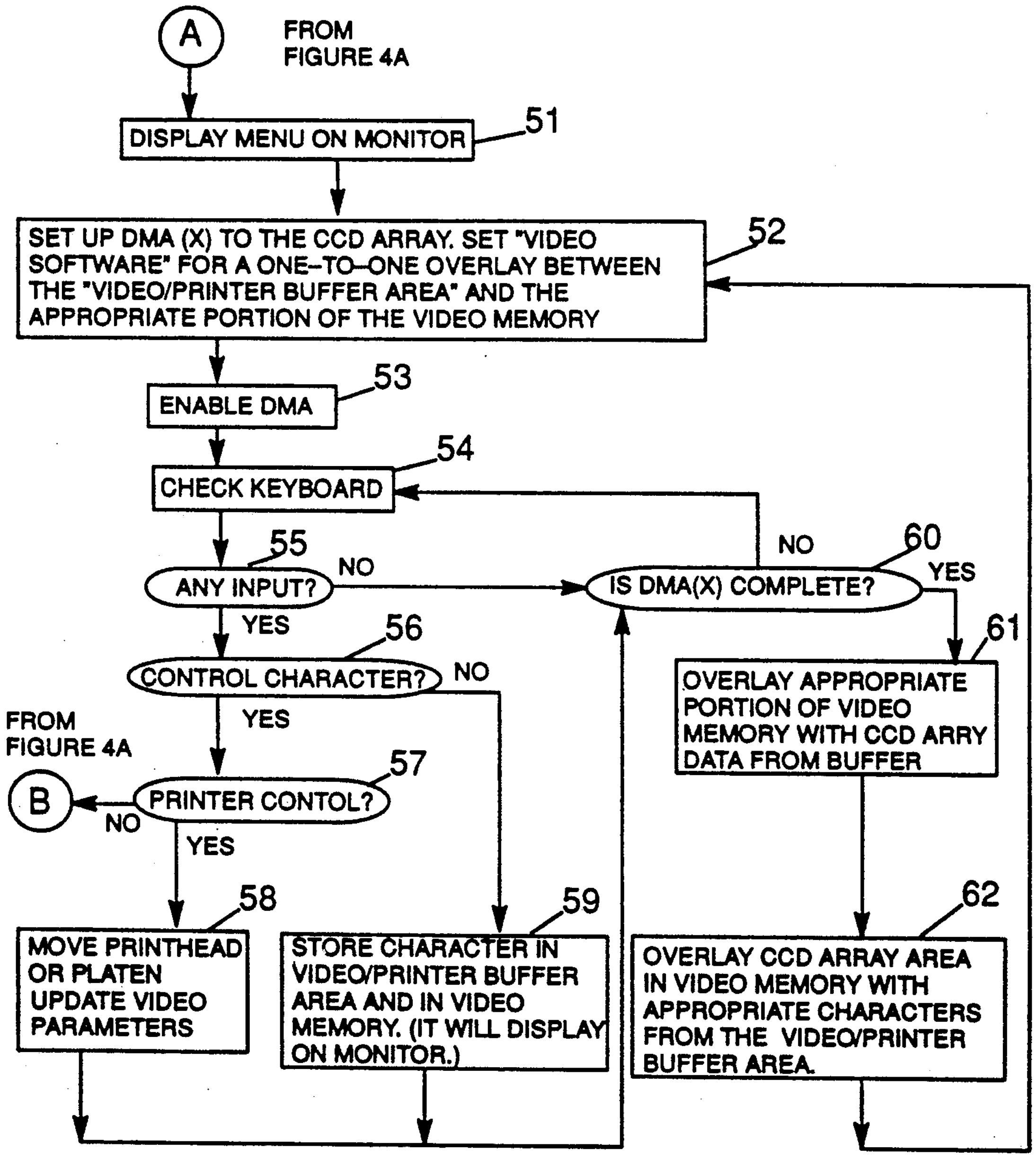

FIGS. 4A and 4B are flowcharts of the operations performed by the printer and associated system under the control of the computer 31 of FIG. 3. Once the user commences operation of the system, computer 31 displays a main program menu (block 40) on monitor 32. The main program menu sets forth a listing of various options, numbered "1" thru "6". Option 1 allows the user to generate new form parameters. Option 2 permits the user to use old form parameters to input data for the previously stored form. Option 3 permits the user to generate a "one time only" form. Option 4 permits the user to print the latest input data onto the form in the printer 10. Option 5 permits the user to print the video/-printer buffer area 314 of computer 31 on the printer 10. Option 6 permits the user to perform other control functions, as deemed desirable.

Presuming that the operator wishes to generate new form parameters and chooses option 1, operator input relative to the name of the new form is requested (block 41), and a new form parameter file is started (block 42). At this point, the operator is instructed to put the form 14 (FIG. 1) in the printer 10 and to position the lens 12 and camera 13, including CCD array 36 (FIG. 3), at the upper left corner of the form 14. Once this is accomplished, the operator presses a predetermined key on keyboard 33 to continue the procedure.

Referring to block 51 of FIG. 4B, the computer 31 displays a control menu on monitor 32. As seen in FIG. 3, the display on monitor 32 consists of a view of the upper left corner of form 14 and a command menu (in the lower right corner of monitor 32). Using the appropriate left, right, forward and backward direction keys on keyboard 33, the user interactively directs computer 31 to control printer 10 to follow the form line by line and, when a blank or box appears on monitor 32, the user types appropriate data on keyboard 33. Preferably, the entered data consists of a label or identifier which will form a query or request for input of data during future use of the system for this particular form. The label or identifier will be followed with input of the actual data for this particular version of the form.

As data are entered via keyboard 33, the user is able to view the letters or other characters of the data items being entered, such letters or characters being displayed in the viewing area appearing on monitor 32. Once a given data item is completed, the user presses the "ENTER" key on keyboard 33 to enter the data item, and the computer 31 directs the printer 10 to automatically shift the position of printhead 11 so that printhead 11 is positioned over the box or blank in form 14. The printer 10 then prints the appropriate information onto form 14 in the proper place, as commanded by computer 31. Then, printer 10 returns the printhead 11 to the position where it left off, and the user continues to view the form line by line until the next blank or box is encountered and further data are entered.

In this manner, data items are entered onto the initial form at the exact locations desired through user interaction with computer 31 and monitor 32. For each entry, the computer 31 records the location on the form 14 of each blank or box, and keeps track of the data items in the same order as they are being entered and completed via keyboard 33.

At any subsequent time, when the user desires to complete the same kind of form, the user need only select option 2 (FIG. 4A). If option 2 (use of old form parameters to input data) is chosen, the operator is requested to enter the name of the old form (block 43) and the "old form" parameter file is called up (block 44). The operator is then presented with each of the parameter identifiers or queries, one at a time (block 45). In this regard, the user need only respond to the successive queries (established during prior execution of option 1) by typing on keyboard 33 the data items themselves in proper sequence as requested. Once all the data are entered via keyboard 33, the system asks the operator if the data are to be saved (block 46). If so, the input heading of the file is stored (block 47), the latest data file is stored in the sub-directory of the "old form" used (block 48), and a return to the main program menu (block 40) is executed. Returning to block 46, if the data is not to be saved, a return to the main program menu (block 40) is executed.

The user can then select option 4 to print the latest input data onto the form in the printer 10. Specifically, the user inserts form 14 into printer 10 and properly positions printhead 11 in the upper left corner of form 14. Upon pressing of a predetermined control key on keyboard 33, the computer 31 automatically enters the data items on form 14 in the exact and proper locations, using its memory of the initial filled-in form of the same type.

Returning to the main program menu (block 40), the operator may select option 3 to fill in a new form for immediate use without saving parameters to generate further versions of the new form later on. Thus, option 3 is merely a short-cut for the user in preparing "one time only" forms.

Returning to the flowchart of FIG. 4B, blocks 51–62 are executed whenever the user has selected options 1 or 3 on the main program menu (block 40 of FIG. 4A). In that regard, the control menu is displayed on monitor 32 (block 51), and the computer 31 sets up DMA to the CCD array 36, and sets the "video software" for a one-to-one overlay between the video/printer buffer area 314 and the appropriate portion of video memory 316 in computer 31 (see block 52). More specifically, the program of computer 31 advises the internal DMA controller 322 of the starting address in RAM 310 (the CCD array buffer area 312) of the block of data and how many bytes are to be allowed in before a TC signal will be generated (in the example, 25,000).

With respect to the second function of computer 31 listed above (setting the "video software"), it should be noted that the video display adapter 318 has a "text" mode and a "graphics" mode. In normal operation, adapter 318 is in the "text mode", and simple software is employed to take an ASCII character typed on keyboard 33 and put it into the appropriate location in video memory 316. This immediately appears on monitor 32 as the appropriate character. Video memory 316 is continuously displayed on monitor 32 via operation of video display adapter 318.

In the application described herein, video display adapter 318 is in the "graphics" mode. In such a situation, the video software takes a keyboard character, converts it into an appropriate graphics character, and moves it into the appropriate location in video memory 316, from which location it will be displayed on monitor 32 by video display adapter 318.

It should also be noted that the typical VGA monitor normally has only 680 spots across a line and only 450 lines in the vertical direction. Presuming that the CCD array 36 scans 100 spots/inch and the paper is 8½ inches wide, then 850 spots across a line will be needed at the minimum. This is handled in a manner similar to the familiar spreadsheets. The area in video/printer buffer area 314 is much larger than the video memory 316 and, according to the movements or keystrokes which have occurred in the past, the appropriate area of video/printer buffer area 314 is overlaid into the video memory 316. This is referred to above as "one-to-one overlay" between video/printer buffer area 314 and the appropriate portion of video memory 316.

Figure 5A:
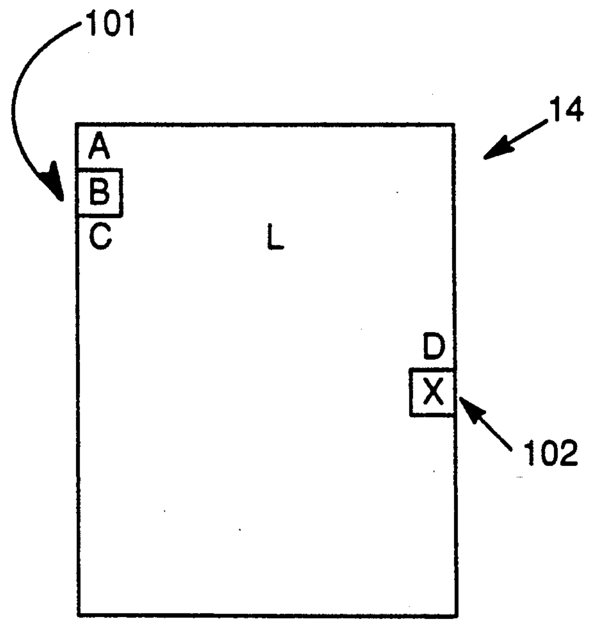
FIGS. 5A and 5B are diagrams of the paper or form of FIG. 1 and the appropriate storage area in the video/printer buffer area of FIG. 3.
Figure 5B:
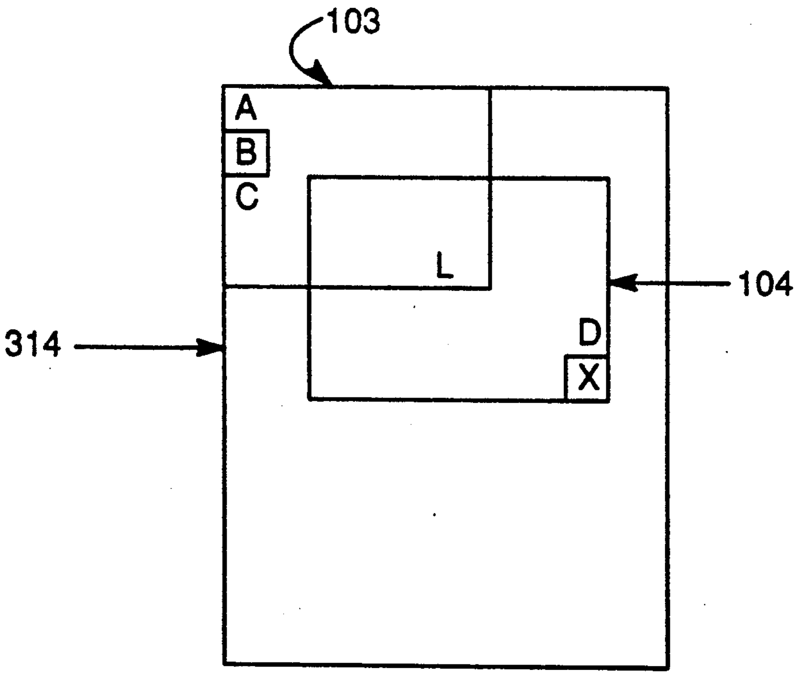

FIGS. 5A and 5B are diagrams of the paper 14 of FIG. 1 and the appropriate storage area in video/printer buffer area 314 of FIG. 3, and will be used to describe further the latter concept of "one-to-one overlay". When the scan head of CCD array 36 is over the point on paper 14 marked with a "B", monitor 32 will show the letters A, B, C and L if we assume that the letters have already been typed in. As the scan head moves to the right across the paper, A, B and C will remain stationary on the monitor 32 until the scan head reaches the right-hand side of monitor view #1 (in the lower portion of FIG. 5). Then, any further steps to the right of the scan head will cause A, B and C to disappear at the left side of monitor 32. The same concept also applies to working in the up/down direction.

The letter L appears in the lower and middle of monitor view #1 and in the upper left portion of monitor view #2. It should be noted that the video/printer buffer area 314 is shown as being larger than necessary to type an 8½×11 inch piece of paper at 100 dots/inch resolution.

Finally, in order to overlay the proper position of video/printer buffer area 314, the video software must keep track of the location of the scan head of CCD array 36. These X and Y coordinates are some of the video parameters that must be updated. The X and Y parameters (which denote the printhead position) are important to the operation as described. When new data are entered, that data begins at coordinates Xn, Yn, and this is how the computer knows where to put that information on a blank form.

Referring to block 53, the computer 31 then enables DMA computer interface 34. Referring to blocks 54 and 55, the computer 31 checks the keyboard 33 for entries. If there is an entry, a determination as to whether or not a control character has been entered is made (block 56). If a control character has been entered, the computer 31 determines whether printer control has been indicated (block 57). If so, the printhead 11 or platen 17 is moved, in accordance with whether a left or right movement command or a forward or backward movement command has been entered on the keyboard, and the video parameters mentioned above (e.g., X and Y parameters) are updated (block 58). Once the video parameters are updated, a determination as to whether or not DMA is complete is made (block 60). If not, the keyboard is again checked (block 54); if so, an appropriate portion of video memory 316 is overlaid with data from CCD array 36 via buffer area 312 (block 61), and the CCD array area in video memory 316 is overlaid with appropriate characters from the video/printer buffer area 314 (block 62). At that point, a return to block 52 is executed.

Returning to block 57, if printer control is not indicated, a transfer to block 49 (FIG. 4A) is executed.

Returning to block 56, if a control character is not indicated, the character entered is stored in the video/printer buffer area 314 and in video memory 316, since such a character is a data entry. Accordingly, the character entered is displayed on monitor 32 (block 59), and a return to block 60 for a determination as to whether or not DMA is complete is executed.

While preferred forms and arrangements have been shown in illustrating the invention, it is to be understood that various changes in detail and arrangement may be made without departing from the spirit and scope of this disclosure.

We claim:

1. A system providing a user with the capability of interactively and sequentially printing entered data on sequentially selected portions of a form positioned in a printer, comprising:

camera means mounted on said printer in proximity to the form for providing output signals corresponding to a view of each selected portion of the form;

display means connected to said camera means for receiving the output signals of said camera means and responsive thereto for displaying to the user the view of each selected portion of the form;

printhead means mounted on said printer in proximity to the form for printing the entered data on the sequentially selected portions of the form; and control means operable by the user for selecting given portions of the form for display on said display means, said camera means being responsive to said control means for moving into a viewing position adjacent to each selected given portion of the form.

2. The system of claim 1, said control means being further operable by the user for receiving a data input from the user for each selected given portion of the form and, once the data input is received, for moving said printhead means into a printing position adjacent to said each selected given portion of the form, said printhead means being responsive to said control means for printing the data input received from the user onto said each selected given portion of the form.

3. The system of claim 2, wherein said printhead means is responsive to said control means for printing each data input received from the user onto said each selected given portion of the form immediately after said each data input is received from the user.

4. The system of claim 2, further comprising memory means for memorizing the location on the form of each given portion of the form selected by the user, and for memorizing each data input for each selected given portion of the form, as received from the user.

5. The system of claim 1, further comprising memory means for memorizing the location on the form of each given portion of the form selected by the user.

6. The system of claim 5, wherein said control means is operable by the user for receiving a name identifying a specific form, said control means being operatively associated with said memory means and responsive to the name received from the user for automatically selecting, in sequence, each given portion of the specific form.

7. The system of claim 6, wherein said control means is further operable by the user for receiving a data input from the user for each automatically selected given portion of the specific form.

8. The system of claim 7, wherein said control means is further operable by the user for receiving a print command after all data inputs have been received from the user, said printhead means being responsive to said print command for automatically and sequentially moving to each memorized location on the form and printing a corresponding data input from the data inputs that have been received from the user.

9. The system of claim 1, said control means being further operable by the user for receiving a data input from the user for each selected given portion of the form, said display means being responsive to reception of the data input from the user by said control means for displaying the data input in conjunction with display of the view of said each selected given portion of the form.

* * * * *